(12) United States Patent
Shi et al.

(10) Patent No.: US 11,763,240 B2
(45) Date of Patent: Sep. 19, 2023

(54) ALERTING SYSTEM FOR SOFTWARE APPLICATIONS

(71) Applicant: Business Objects Software Ltd., Dublin (IE)

(72) Inventors: Jiandong Shi, Shanghai (CN); Katherine Wright, New Westminster (CA); Flavia Moser, Vancouver (CA); Ahmet Yoldemir, Vancouver (CA)

(73) Assignee: BUSINESS OBJECTS SOFTWARE LTD, Dublin (IE)

( * ) Notice: Subject to any disclaimer, the term of this patent is extended or adjusted under 35 U.S.C. 154(b) by 0 days.

(21) Appl. No.: 17/068,692

(22) Filed: Oct. 12, 2020

(65) Prior Publication Data

US 2022/0114526 A1  Apr. 14, 2022

(51) Int. Cl.
*G06Q 10/0639* (2023.01)
*G06F 3/0482* (2013.01)

(52) U.S. Cl.
CPC ..... *G06Q 10/06393* (2013.01); *G06F 3/0482* (2013.01)

(58) Field of Classification Search
CPC .............. G06Q 10/06393; G06F 3/0482
See application file for complete search history.

(56) References Cited

U.S. PATENT DOCUMENTS

| | | | | |
|---|---|---|---|---|
| 2010/0023362 | A1* | 1/2010 | Nguyen | G06Q 10/06393 |
| | | | | 705/7.39 |
| 2010/0169328 | A1* | 7/2010 | Hangartner | G06Q 30/02 |
| | | | | 707/751 |
| 2016/0210224 | A1* | 7/2016 | Cohen | G06F 11/3684 |
| 2017/0192648 | A1* | 7/2017 | Abedin | G06Q 10/06393 |
| 2017/0372248 | A1* | 12/2017 | Ghosh | G06Q 10/06393 |
| 2019/0050463 | A1* | 2/2019 | Goradia | G06F 16/248 |
| 2019/0102460 | A1* | 4/2019 | Tabak | G06F 11/3006 |
| 2019/0104041 | A1* | 4/2019 | Tabak | G06F 3/0482 |
| 2019/0220153 | A1* | 7/2019 | Kidron | G06Q 10/06393 |
| 2020/0104775 | A1* | 4/2020 | Chintalapati | G06F 9/451 |
| 2021/0004704 | A1* | 1/2021 | Dang | H04L 67/10 |
| 2021/0117868 | A1* | 4/2021 | Sriharsha | G06F 16/901 |
| 2021/0243148 | A1* | 8/2021 | Moore | H04L 51/18 |
| 2022/0237229 | A1* | 7/2022 | Wong | G06F 16/90332 |

* cited by examiner

*Primary Examiner* — Andrew T Chiusano
(74) *Attorney, Agent, or Firm* — Fountainhead Law Group P.C.

(57) ABSTRACT

Some embodiments provide a non-transitory machine-readable medium that stores a program executable by a device. The program identifies a set of visualizations associated with the user. The program further determines, for each visualization in the set of visualizations, a score associated with changes in the visualization. The program also determines a subset of the set of visualizations based on the set of scores. The program further provides to the user notifications associated with the subset of the set of visualizations.

20 Claims, 11 Drawing Sheets

|        | Chart 1 | Chart 2 | Chart 3 | Chart 4 | Chart 5 |
|--------|---------|---------|---------|---------|---------|
| User 1 | X       | X       |         |         |         |
| User 2 | X       | X       |         | X       |         |
| User 3 | X       | X       |         | X       |         |
| User 4 |         | X       | X       |         |         |
| User 5 |         |         |         | X       | X       |

FIG. 3

| Viz Type \ Change Type | Value Change | Value Change over Threshold | Value Change over Refline | Contribution Change | Deviation Change | Trend Change | Top N Members Change | Box Plot Change |
|---|---|---|---|---|---|---|---|---|
| Numeric Point, Bullet | 4 | 5 | N/A | N/A | N/A | N/A | 5 | N/A |
| Bar/Column/ Line/Area/Combination/ Marimekko/ Heat/Tree Map/ Pie/Donut/ Radar/Waterfall | 3 | 4 | 4 | 3 Stacked: 4 | 3 (exclude Stacked) | N/A | 5 | N/A |
| Waterfall by Account | 4 | N/A | N/A | 4 | 3 | N/A | N/A | N/A |
| Time Series Line Line by Date | N/A | N/A | N/A | N/A | N/A | 3 – 4 (by sub-type) | N/A | N/A |
| Box Plot | 3 | N/A | 4 | N/A | N/A | N/A | N/A | 4 |
| Bubble/Scatter | 1 | 2 (scatter) | 3 (bubble) | N/A | N/A | N/A | 2 (by bubble size) | N/A |

FIG. 5

| Viz Type \ Style Type | Primary Value or Label Font-size, Bold | Secondary Value or Label Font-size, Bold | Category Axis Label Font-size, Bold | Data Label Font-size, Bold | Legend Font-size, Bold | Data Marker Size (100%) | Grouped Dimension Label Font-size, Bold |
|---|---|---|---|---|---|---|---|
| Numeric Point | 5 | 4 | N/A | N/A | N/A | N/A | N/A |
| Bullet | N/A | N/A | N/A | N/A | 4 | N/A | N/A |
| Bar/Column/Line/ Area/Combination/ Marimekko/ Heatmap/Waterfall | N/A | N/A | 3 | 4 | 3 | N/A | N/A |
| Waterfall by Account | N/A | N/A | 4 | 4 | 3 | N/A | N/A |
| Time Series Line | N/A | N/A | N/A | 3 | 3 | N/A | N/A |
| Pie/Donut/Radar | N/A | N/A | N/A | 4 | 3 | N/A | N/A |
| Box Plot | N/A | N/A | 3 | N/A | 3 | N/A | N/A |
| Bubble/Scatter | N/A | N/A | N/A | 3 | 2 | 3 | N/A |
| Tree Map | N/A | N/A | N/A | 4 | 1 | N/A | 3 |

FIG. 6

ALERTING SYSTEM FOR SOFTWARE APPLICATIONS

BACKGROUND

Software applications are often programmed to receive, process, and/or output data. For example, software programs may be configured to receive data from users, retrieve data from data sources, or generate data. Any number of different operations can be performed on data to analyze and/or process it. In addition, software programs may provide users with data, store data in data sources, and/or send data to other software programs for further processing. Some software applications can also generate messages, notifications, and/or alerts that may be provided to users, stored in files, or output to output devices.

SUMMARY

In some embodiments, a non-transitory machine-readable medium stores a program executable by at least one processing unit of a device. The program identifies a set of visualizations associated with the user. The program further determines, for each visualization in the set of visualizations, a score associated with changes in the visualization. The program also determines a subset of the set of visualizations based on the set of scores. The program further provides to the user notifications associated with the subset of the set of visualizations.

In some embodiments, determining, for each visualization in the set of visualizations, the score associated with changes in the visualization may include determining, for each criterion in a set of criteria, a score; normalizing, for each criterion in the set of criteria, the score; and, based on the normalized scores for each criterion in the set of criteria, calculating a total score as the score associated with changes in the visualization. The program may further determine a visualization based on a history of interactions with visualizations performed by the user, wherein the user is not subscribed to the visualization and provide to a client device a notification indicating the visualization as a suggestion for subscribing.

In some embodiments, determining the visualization may include determining the history of interactions includes a number of views of the visualization by the user that is greater than a defined threshold number of views. Determining the visualization may include determining the history of interactions includes interactions with a particular visualization and determining at least one entity of data used by the visualization is the same as an entity of data used by the particular visualization.

In some embodiments, determining the visualization may include determining the history of interactions includes interactions with a particular visualization and determining that a title of the visualization is similar to a title of the particular visualization. Determining the visualization may include determining a set of users that are similar to the user and determining the visualization is subscribed to by at least one user in the set of users.

In some embodiments, a method identifies a set of visualizations associated with the user. The method further determines, for each visualization in the set of visualizations, a score associated with changes in the visualization. The method also determines a subset of the set of visualizations based on the set of scores. The method further provides to the user notifications associated with the subset of the set of visualizations.

In some embodiments, determining, for each visualization in the set of visualizations, the score associated with changes in the visualization may include determining, for each criterion in a set of criteria, a score; normalizing, for each criterion in the set of criteria, the score; and, based on the normalized scores for each criterion in the set of criteria, calculating a total score as the score associated with changes in the visualization. The method may further determine a visualization based on a history of interactions with visualizations performed by the user, wherein the user is not subscribed to the visualization and provide to a client device a notification indicating the visualization as a suggestion for subscribing.

In some embodiments, determining the visualization may include determining the history of interactions includes a number of views of the visualization by the user that is greater than a defined threshold number of views. Determining the visualization may include determining the history of interactions includes interactions with a particular visualization and determining at least one entity of data used by the visualization is the same as an entity of data used by the particular visualization.

In some embodiments, determining the visualization may include determining the history of interactions includes interactions with a particular visualization and determining that a title of the visualization is similar to a title of the particular visualization. Determining the visualization may include determining a set of users that are similar to the user and determining the visualization is subscribed to by at least one user in the set of users.

In some embodiments, a system includes a set of processing units and a non-transitory machine-readable medium that stores instructions. The instructions cause at least one processing unit to identify a set of visualizations associated with the user. The instructions further cause the at least one processing unit to determine, for each visualization in the set of visualizations, a score associated with changes in the visualization. The instructions also cause the at least one processing unit to determine a subset of the set of visualizations based on the set of scores. The instructions further cause the at least one processing unit to provide to the user notifications associated with the subset of the set of visualizations.

In some embodiments, determining, for each visualization in the set of visualizations, the score associated with changes in the visualization may include determining, for each criterion in a set of criteria, a score; normalizing, for each criterion in the set of criteria, the score; and, based on the normalized scores for each criterion in the set of criteria, calculating a total score as the score associated with changes in the visualization. The instructions may further cause the at least one processing unit to determine a visualization based on a history of interactions with visualizations performed by the user, wherein the user is not subscribed to the visualization; and provide to a client device a notification indicating the visualization as a suggestion for subscribing.

In some embodiments, determining the visualization may include determining the history of interactions includes a number of views of the visualization by the user that is greater than a defined threshold number of views. Determining the visualization may include determining the history of interactions includes interactions with a particular visualization and determining at least one entity of data used by the visualization is the same as an entity of data used by the particular visualization. Determining the visualization may include determining the history of interactions includes interactions with a particular visualization and determining that a title of the visualization is similar to a title of the particular visualization.

The following detailed description and accompanying drawings provide a better understanding of the nature and advantages of various embodiments of the present disclosure.

BRIEF DESCRIPTION OF THE DRAWINGS

FIG. 3 illustrates an example table of charts to which users are subscribed according to some embodiments.

FIG. 5 illustrates an example table of scores based on change types of different types of visualizations according to some embodiments.

FIG. 6 illustrates an example table of scores based on style types of different types of visualizations according to some embodiments.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for providing alerting systems for software applications. In some embodiments, a system includes an application that provides a variety of different visualizations. The visualizations may show data associated with key performance indicators (KPIs). Users of the applications are able to subscribe to any of the visualizations. When a user subscribes to a visualization, the application can send alerts about the visualization to the user. The application includes a feature that provides users with suggestions of visualizations to which users may want to subscribe. The visualizations that the application suggests for a particular user can be based on the particular user's history of interactions with visualizations and/or the visualizations to which the particular user is subscribed.

In some embodiments, the application is configured to provide users with alerts associated with changes to the underlying data of visualizations. For a particular user, the system may identify which visualizations have changes and then calculate scores for each of these visualizations. Then, the system provides alerts for a defined number of the visualizations to the particular user based on the scores associated with the visualizations. The system may use a number of different criteria to calculate the score for a particular visualization. In addition to alerts, the application can provide suggested actions that a user can take in response to the alerts.

The techniques described in the present application provide a number of benefits and advantages over conventional alerting systems. For instance, providing alerts for a defined number of visualizations not only prevents users from being overwhelmed with alerts, but it can also reduce the amount of processing required to generate alerts and the amount of bandwidth used to transmit the alerts. Conventional alerting systems that indiscriminately provide alert users would use much more resources, especially when there are many users.

Figure 1:
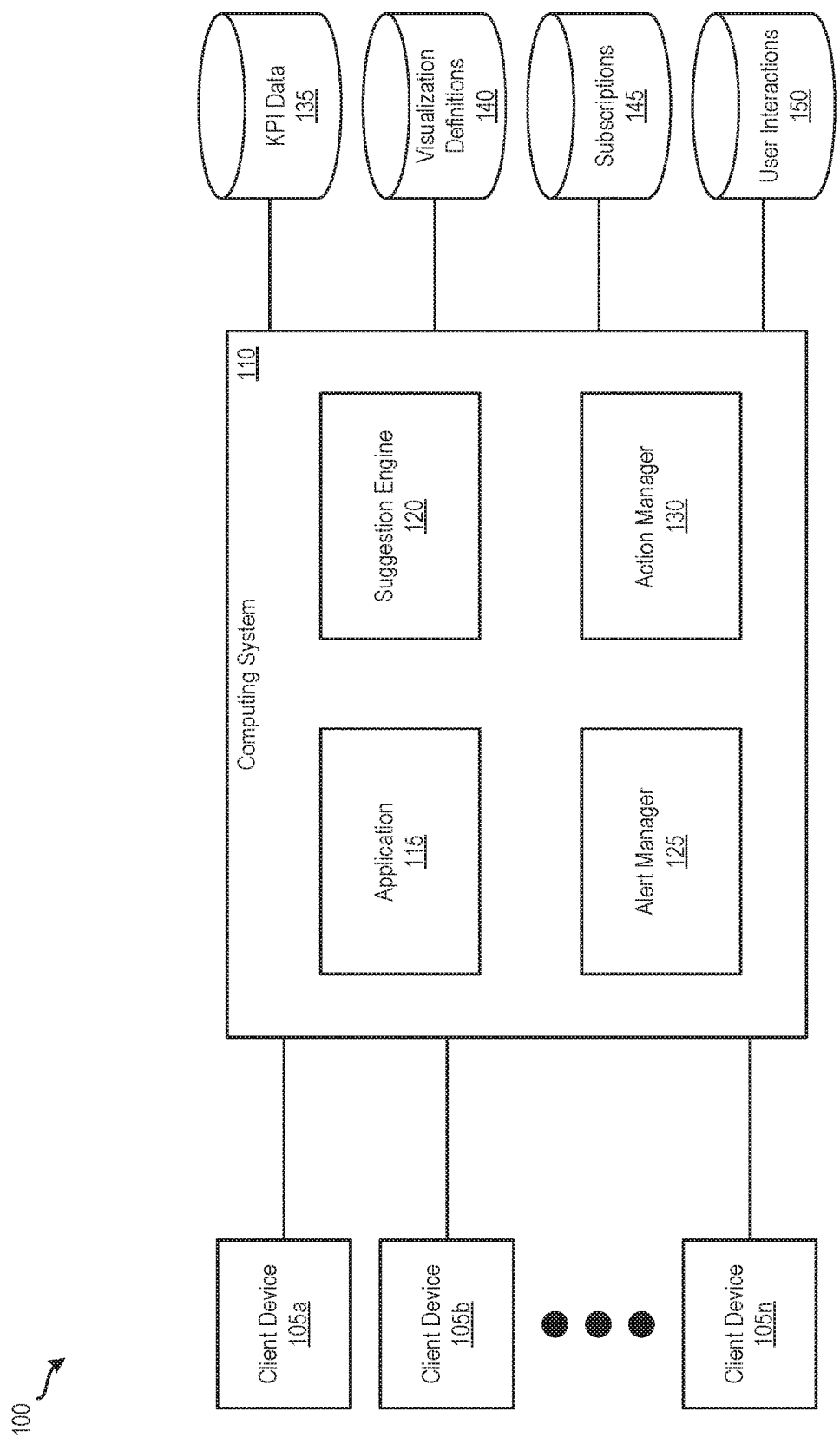
FIG. 1 illustrates a system according to some embodiments.

FIG. 1 illustrates a system 100 according to some embodiments. As shown, system 100 includes client devices 105 a-n, computing system 110, and storages 135, 140, 145, 150. KPI data storage 135 is configured to store data associated with KPIs. Visualization definitions storage 140 stores definitions of visualizations. In some embodiments, a visualization definition includes metadata describing the title of the visualization, the type of visualization, the measure(s) and/or dimension(s) (also referred to collectively as entities) of data used in the visualization, etc. In some embodiments, a measure is a field in a dataset that is configured to store quantitative (e.g., numeric) data and a dimension is a field in the dataset that is configured to store qualitative data. In some embodiments, a dimension is configured to categorize measures based on the dimension values of the dimension. Values stored in a measure can be referred to as measure values and values stored in dimensions can be referred to as dimension values. Subscriptions storage 145 is configured to store user subscriptions to visualizations. User interactions storage 150 stores users' interactions with visualizations. In some embodiments, storages 135, 140, 145, 150 are implemented in a single physical storage while, in other embodiments, storages 135, 140, 145, 150 may be implemented across several physical storages. While FIG. 1 shows storages 135, 140, 145, 150 as external to computing system 110, one of ordinary skill in the art will appreciate that KPI data storage 135, visualization definitions storage 140, subscriptions storage 145, and/or user interactions storage 150 may be part of computing system 110 in some embodiments.

Client devices 105 a-n are configured to communicate and interact with computing system 110. For example, a user may use a client device 105 to access application 115 of computing system 110 to interact with visualizations. Specifically, the user of a client device 105 can request to view a set of visualizations, to view a particular visualization, to subscribe to a particular visualization, or to unsubscribe from a particular visualization. When accessing application 115, a user of client device 105 can receive suggestions of visualizations to which the user might want to subscribe. Also, the user of client device 105 may receive alerts associated with changes to visualizations. The alerts can include suggestions of actions that the user can take in response to the alerts.

Figure 2:
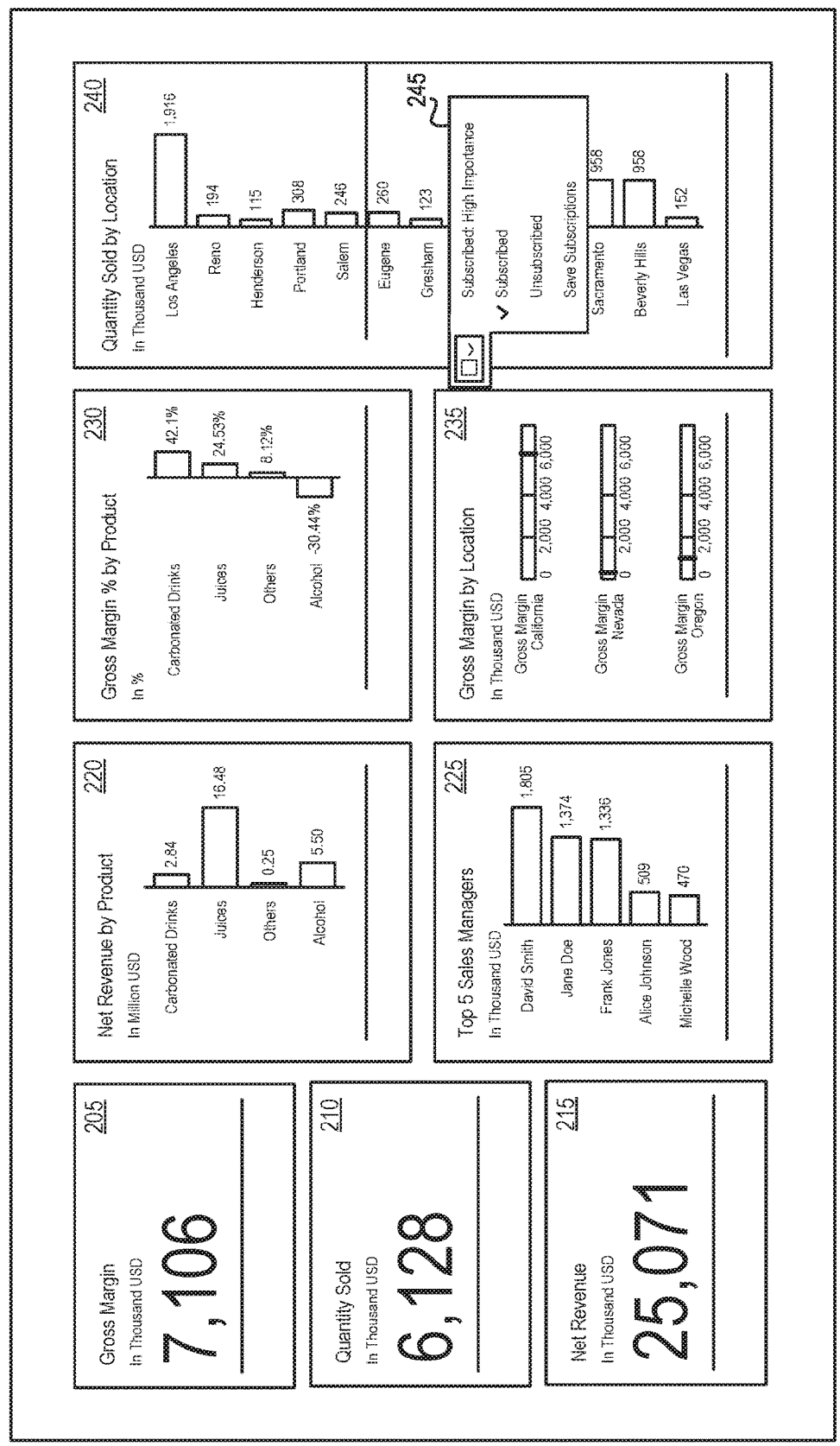
FIG. 2 illustrates an example of visualizations provided to a user according to some embodiments.

FIG. 2 illustrates an example of visualizations provided to a user according to some embodiments. In particular, FIG. 2 illustrates a graphical user interface (GUI) 200 that includes visualizations 205, 210, 215, 220, 225, 230, 235, 240. In this example, application 115 provides a user of client device 105 with GUI 200 (e.g., when the user logs into application 115). As shown, visualizations 205, 210, 215, 220, 225, 230, 235, 240 show data associated with various KPIs. Different types of visualizations may be used to present data associated with KPIs. Here, visualizations 205-215 are numeric point type visualizations. Visualization 205 shows a numerical value for a gross margin KPI, visualization 210 shows a numerical value for a quantity sold KPI, and visualization 215 shows a numerical value for a net revenue KPI. Visualizations 220, 225, 230, 235, 240 are bar chart type visualizations. Visualization 220 shows a bar chart for a net revenue by product KPI, visualization 225 shows a bar chart for a top 5 sales manager KPI, visualization 230 shows a bar chart for a gross margin percentage by product KPI, visualization 235 shows a bullet chart that has indicators between 0-6000 for showing a gross margin by location KPI, and visualization 240 shows a bar chart for a quantity sold by location KPI.

FIG. 2 also illustrates a user of client device 105 requested to subscribe to visualization 240. Here, the user of client device 105 provided input (e.g., a right-click mouse input in the display area of visualization 240, a selection of an option from a drop down menu after visualization 240 is selected, a hotkey keyboard input after visualization 240 is selected, etc.) to invoke popup menu 245. Then, the user of client device 105 requested to subscribe to visualization 240 by selecting the "Subscribe" option in popup menu 245. When client device 105 receives the selection, client device 105 sends the request to application 115. Upon receiving the request, application 115 accesses subscriptions storage 145 to identify the group of visualizations to which the user is subscribed and adds visualization 240 to the group.

Returning to FIG. 1, computing system 110 includes application 115, suggestion engine 120, alert manager 125, and action manager 130. Application 115 may be a software application operating on (e.g., hosted on) computing system 110 that may be accessed by client devices 105a-n. Application 115 can be any number of different types of applications. For example, application 115 may be an analytics application, a business intelligence application, a data management application, a human capital management application, an enterprise management application, a customer relationship management application, a financial management application, etc. Application 115 is configured to provide client devices 105a-n suggestions of visualizations, alerts associated with visualizations, and actions to take in response to alerts.

Application 115 can process requests from client devices 105 a-n. For instance, application 115 may receive from a client device 105 a request to view a set of visualizations. In response, application 115 accesses visualization definitions storage 140 to retrieve definitions of the requested visualizations, accesses KPI data storage 135 to retrieve KPI data for the requested visualizations, generates the visualizations based on the retrieved visualization definitions and KPI data, and provides the client device 105 with the set of visualizations (e.g., via GUI 200). In some cases, application 115 can receive from a client device 105 a request to view a particular visualization. For example, the user of client device 105 may select a visualization in GUI 200 for viewing. In response to the request, application 115 accesses visualization definitions storage 140 to retrieve definition of the requested visualization, accesses KPI data storage 135 to retrieve KPI data for the requested visualization, generates the visualization based on the retrieved visualization definition and KPI data, and provides the client device 105 with the visualization (e.g., via GUI 200). As another example, application 115 may receive from a client device 105 a request to subscribe to a visualization. In response, application 115 accesses subscriptions storage 145 to identify the group of visualizations to which the user is subscribed and adds the visualization to the group. In addition, application 115 can receive from a client device 105 a request to unsubscribe from a visualization. In response to such a request, application 115 accesses subscriptions storage 145 to identify the group of visualizations to which the user is subscribed and removes the visualization from the group.

Suggestion engine 120 is configured to determine suggestions of visualizations for users. Suggestion engine 120 may use different techniques to determine suggestions of visualizations for a particular user. For example, suggestion engine 120 can access user interactions storage 150 to retrieve a history of a user's interactions with visualizations. If the history of the user's interactions includes a number of views of a particular visualization that is greater than a defined threshold number of views, then suggestion engine 120 may determine to suggest the particular visualization to the user. As another example, suggestion engine 120 can examine the history of the user's interactions and identify a defined number of visualizations with the most views (e.g., three visualizations with the most views, five visualizations with the most views, etc.). Suggestion engine 120 determines to suggest the identified visualizations to the user.

In some instances, suggestion engine 120 can determine suggestion of visualizations for a particular user based on the particular user's interaction with similar visualizations. For instance, suggestion engine 120 may access subscriptions storage 145 to identify visualization to which the user is subscribed and access visualization definitions storage 140 to retrieve the visualization definitions of the visualizations to which the user is subscribed. Next, suggestion engine 120 examines the metadata of the visualization definitions to identify the measures and/or dimensions used by the visualizations. Then, suggestion engine 120 accesses visualization definitions storage 140 to search for visualization definitions that include at least one of the identified measures and/or dimensions. Suggestion engine 120 determines to suggest to the user the visualizations associated with the visualization definitions resulting from the search. As another example, suggestion engine 120 may determine visualizations to suggest to a user by comparing the titles of the visualizations, which are specified in the visualization definitions, of the visualizations to which the user is subscribed with the titles of other visualizations. In some embodiments, suggestion engine 120 uses a text embedding based technique to determine the similarity between the titles of two visualizations. Examples of such techniques include a sentence-BERT technique, a universal sentence encoder technique, etc.

In some embodiments, suggestion engine 120 may determine suggestions of visualizations for a particular user based on users that are similar to the particular user. In some cases, suggestion engine 120 uses a memory-based approach in which suggestion engine 120 utilizes a k-nearest neighbors algorithm (k-NN) to make such a determination.

FIG. 3 depicts an example of the memory-based approach mentioned above. Specifically, FIG. 3 illustrates an example table 300 of charts to which users are subscribed according to some embodiments. As shown, table 300 includes columns 305, 310, 315, 320, 325 and rows 330, 335, 340, 345, 350. Column 305 is for indicating that a user is subscribed to Chart 1, column 310 is for indicating that a user is subscribed to Chart 2, column 315 is for indicating that a user is subscribed to Chart 3, column 320 is for indicating that a user is subscribed to Chart 4, and column 325 is for indicating that a user is subscribed to Chart 5. Row 330 is for storing visualizations to which a User 1 is subscribed, row 335 is for storing visualizations to which a User 2 is subscribed, row 340 is for storing visualizations to which a User 3 is subscribed, row 345 is for storing visualizations to which a User 4 is subscribed, and row 350 is for storing visualizations to which a User 5 is subscribed. In this example, table 300 will be used to determine suggestions of visualizations for a user. Here, suggestion engine 120 provides as input to the k-NN algorithm table 300, 2 as the value for k, and User 1 as the user on which to focus. As such, the k-NN algorithm will find 2 users that are the most similar to User 1 based on the data in table 300. For this example, the k-NN algorithm outputs Users 2 and 3 as the most similar to User 1. That is, the visualizations to which Users 2 and 3 are subscribed are most similar to the visualizations to which User 1 is subscribed. Next, suggestion engine 120 determines visualizations in table 300 to which either User 2 or User 3 are subscribed but to which User 1 is not subscribed. In this example, the User 2 and User 3 subscribe to the Chart 4 visualization, but User 1 does not. As such, suggestion engine 120 determines to suggest the Chart 4 visualization to User 1.

Returning to FIG. 1, in other cases, suggestion engine 120 uses a model-based approach. With the model-based approach, low-dimensional and latent factors capture various properties of visualizations. The interest of users in a particular visualization depends on their interest in these latent properties. Similar to the memory-based approach, in a model-based approach, suggestion engine 120 starts by creating a user subscription matrix (e.g., table 300). To find all the user-KPI dependencies, suggestion engine 120 decomposes the matrix into two lower-dimensional matrices using matrix factorization.

Figure 4:
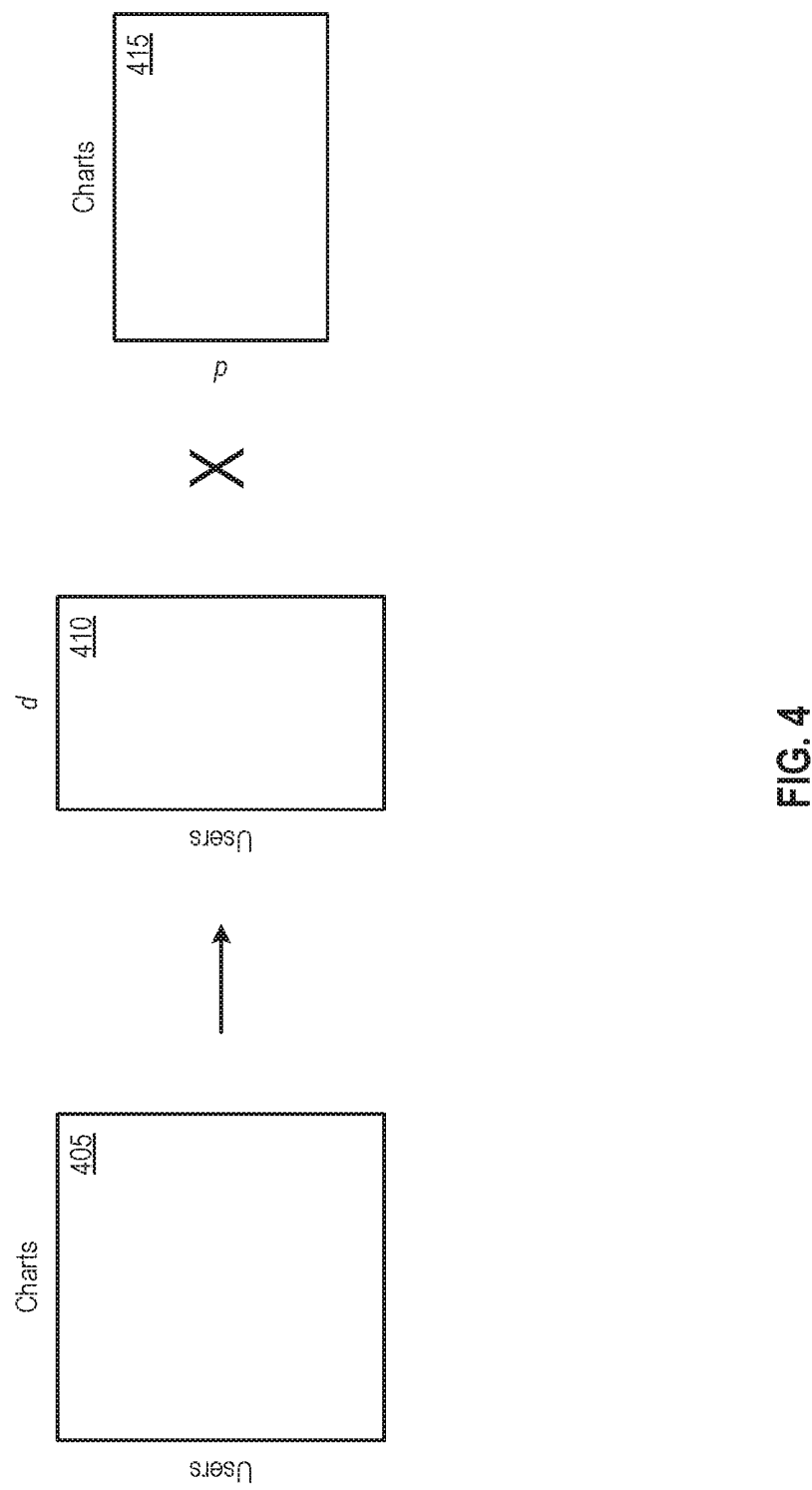
FIG. 4 illustrates an example matrix decomposition according to some embodiments.

FIG. 4 illustrates an example matrix decomposition according to some embodiments. FIG. 4 shows user subscription matrix 405. Similar to table 300, the columns of user subscription matrix 405 are for indicating which users are subscribed to which visualizations and the rows of user subscription matrix 405 are for storing the visualizations to which each user are subscribed. As shown, suggestion engine 120 decomposes user subscription matrix 405 into matrix 410 and matrix 415. Through matrix factorization, suggestion engine 120 extracts d latent factors (also referred to as features). As such, the columns of matrix 410 are for storing the d latent factors and the rows of matrix 410 are for storing the latent factors in which each user is interested. The columns of matrix 415 are for indicating which latent factors are associated with a particular visualization and the rows of matrix 415 are for indicating which visualizations are associated with a particular latent factor. In some embodiments, the dimensionality of d is less than both the dimensionality of User and Charts. As illustrated, matrix factorization allows users and visualizations to be represented in the same space and dimensionality. As a simplified example, assume that the users fall into two lines of business: human resources (HR) and marketing. This is captured by a first feature. Now, a cell in the first column of the matrix 410 can indicate the corresponding user's line of business (e.g. 0 if HR, 1 if marketing). Similarly, a cell in the first row of matrix 415 can indicate the line of business to which the corresponding visualization is associated. Once matrix 405 is decomposed into matrices 410 and 415, suggestion engine 120 may predict whether a particular user would be interest in a particular visualization by taking the dot product of the row corresponding to the particular user in the matrix 410 and the column corresponding to the particular visualization in the matrix 415. In this manner, suggestion engine 120 may predict which visualizations a particular user would be interested in and determine suggestions of visualizations based on these predictions.

Returning to FIG. 1, alert manager 125 is responsible for providing alerts associated with changes to visualizations to users of client devices 105 a-n. In some embodiments, alert manager 125 determines a defined number of alerts (e.g., three alerts, five alerts, ten alerts, etc.) to provide to a user of a client device 105 at a given time. In some cases, alert manager 125 sends alerts associated with changes to visualizations to which a user is not subscribed. Alert manager 125 may determine the defined number of alerts to provide a particular user by accessing KPI data storage 135 and visualization definitions storage 140 to identify which visualizations have had their underlying data change. In some cases, the visualizations that alert manager 125 selects from are limited to visualizations being presented to the user (e.g., visualizations in GUI 200). From the identified visualizations, alert manager 125 calculates a score for each visualization. Then, alert manager 125 generates the defined number of alerts for visualizations with the highest scores. For example, if the defined number of alerts is three, alert manager 125 generates alerts for three visualizations with the highest scores (i.e., the top three scores). Alert manager 125 may notify action manager 130 about the generated alerts.

In some embodiments, alert manager 125 calculates a score for a visualization based on a number of different criteria. For example, in some such embodiments, alert manager 125 calculates a score for a visualization based on six criteria: the magnitude of the change, the type of change, the visualization style, the number of measures and/or dimensions involved, the count of the same KPI in other visualizations, and visualizations to which the user is subscribed. Alert manager 125 can calculate a score for each of the criterion and then calculate a total score for the visualization by calculating a weighted sum of the scores for the criterion. In some embodiments, the weights used for each criteria may be automatically determined using a regression or classification predictive model trained on user feedback (e.g., a user responds that an alert is not useful, a user opens the alert, a user responds that an alert is useful, etc.).

To calculate a score for the magnitude of the change criteria, alert manager 125 calculates the difference between the current value of the KPI data and the previous value of the KPI data. For a visualization that has an axis scale, alert manager 125 calculates the change in KPI data and normalizes the change based on the axis scale to a value between 0-100%. If a visualization has two axes, alert manager 125 normalizes the change on a per axis basis to a value between 0-100%. In cases where the visualization includes a series of data (e.g., a bullet chart), alert manager 125 normalizes the change to a value between 0-100% on a per-series basis. If the visualization includes percentage values, alert manager 125 calculates the change using the absolute difference and normalizes the change to a value between 0-100%. For instances where a visualization has a date axis, alert manager 125 checks whether the change is a continuous (e.g., three data points or more) increase or decrease. If the change is continuous, alert manager 125 multiplies the change by a defined value (e.g., 1.382) and normalizes the product to a value between 0-100%.

In some cases, a visualization has a threshold value defined. In those cases, alert manager 125 calculates the score for the magnitude of the change criteria using the following equation (1):

$$\text{score} = (1 + (\text{new\_range\_index} - \text{old\_range\_index})) \times \text{value\_change}$$

where score is the score for the magnitude of the change criteria, new_range_index is the range of the new index, old_range_index is the range of the old index, and value_change is the change of the KPI data in terms of a percentage. In some instances, a visualization has a reference line. In such instances, alert manager 125 calculates the score for the magnitude of the change criteria using the following equation (2):

score=(1+(new_range_index−old_range_index)× 0.618)×value_change where score is the score for the magnitude of the change criteria, new_range_index is the range of the new index, old_range_index is the range of the old index, and value_change is the change of the KPI data in terms of a percentage. For contribution changes, alert manager 125 calculates the change in contribution percentage as the score for the magnitude of the change criteria. If the top contributor member changes and the value is greater than twice the average value, alert manager 125 doubles the top contribution percentage. If the change is a deviation change, alert manager 125 calculates the score for the magnitude of the change criteria by subtracting the old standard deviation from the new deviation and then dividing the difference by the old standard deviation.

For top N member changes, alert manager 125 calculates the score for the magnitude of the change criteria based on new members and changes to a defined number of top members. Alert manager 125 gives higher scores for changes to higher positions. For instance, a top 10 visualization may have changes to positions 1, 2, 5 and 8 where positions 2 and 8 are new members. If the defined number of top members is 3, alert manager 125 can calculate the score for the magnitude of the change criteria as follows:

$$score = \frac{((9+3)+(10+9))}{((1+2+3+4+5+6+7+8+9+10)+(1+2+3))}$$

where score is the score for the magnitude of the change criteria. Here, the (9+3) term represents values assigned for new members in positions 2 and 8 and the (10+9) term represents the values assigned for changes to positions 1 and 2 in the top 3. For changes to box plot outliers, alert manager 125 takes the maximum value among the lower whisker, first quartile, third quartile, upper whisker, and number of outliers as the score for the magnitude of the change criteria. If the change to the box plot outlier is over a reference line, alert manager 125 calculates the score for the magnitude of the change criteria using the equation (2). The value for the number of outliers may be calculated by multiplying a define value (e.g., 1.618) by the value change in terms of a percentage.

In instances where the change is a trend change, alert manager 125 calculates the linear trend line angle (e.g., −90° to 90° by the same time range) and normalizes it to a value between 0-100%. For changes relative to the last trend, alert manager 125 multiplies the trend change percentage by a defined value (e.g., 1.382). For changes relative to parent members' trends, alert manager 125 multiplies the trend change percentage by (1+1/the trend count). If recent period changes are different from the overall trend, alert manager 125 multiplies the trend change percentage by (1+the recent trend period/all periods). If recent period changes are over a reference line and is different from the overall trend, alert manager 125 multiplies the trend change percentage by (1+the recent trend period/all periods) and a defined value (e.g., 1.382). For outliers that are found since the last period and outlier detection confidence is high, alert manager 125 uses the outlier value change percentage.

To determine a score for the type of change criteria, alert manager 125 may determine the type of change in the KPI data, determine the type of visualization, and then determine the score based on the type of change and the type of visualization. FIG. 5 illustrates an example table 500 of scores based on change types of different types of visualizations according to some embodiments. In particular, FIG. 5 shows the scores that alert manager 125 determines for each type of change in a particular type of visualization. As shown, each column in table 500 represents scores for a particular type of change and each row in table 500 represents scores for a particular type of visualization. Once alert manager 125 determines the score, alert manager 125 normalizes it to a value between 0-100%.

Alert manager 125 can determine a score for the visualization style criteria by determining the type of visualization, determining the type of style used in the visualization, and then determine the score based on the type of visualization and the type of style. FIG. 6 illustrates an example table 600 of scores based on style types of different types of visualizations according to some embodiments. Specifically, FIG. 6 shows the scores that alert manager 125 determines for each type of style used in a particular type of visualization. As shown, each column in table 600 represents scores for a particular type of style used in a visualization and each row in table 600 represents scores for a particular type of visualization. After determining the score, alert manager 125 normalizes it to a value between 0-100%.

For the number of measures and/or dimensions involved criterion, alert manager 125 determines the number of measures and/or dimensions used in the visualization and divides that number by the number of measures and/or dimensions used in the visualization with the most number of measures and/or dimensions. Next, alert manager 125 normalizes the quotient to a value between 0-100%. For the count of the same KPI in other visualizations criteria, alert manager 125 determines the number of instances the same KPI appears, divides that number by the total number of instances of all KPIs, and normalizes the quotient to value between 0-100%. For the visualizations to which the user is subscribed criterion, if the user is not subscribed to the visualization, alert manager 125 determines the score to be 0. If the user is subscribed to the visualization with a default importance, alert manager 125 determines the score to be 100%. If the user is subscribed to the visualization with a high importance, alert manager 125 determines the score to be 200%.

Figure 7:
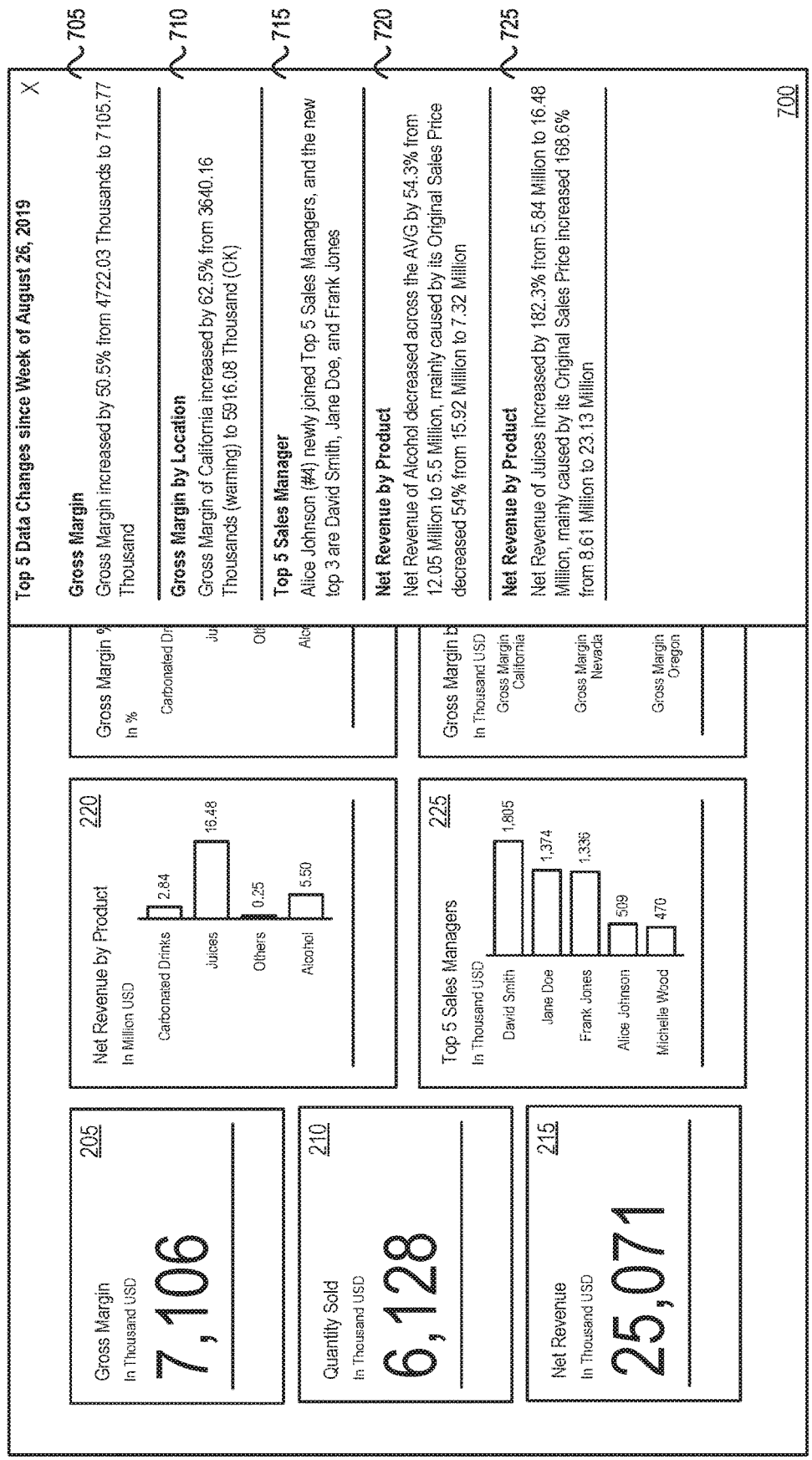
FIG. 7 illustrates an example of alerts provided to a user according to some embodiments.

FIG. 7 illustrates an example of alerts provided to a user according to some embodiments. In particular, FIG. 7 shows the same GUI 200 that is shown in FIG. 2 except FIG. 7 also depicts alerts presented in GUI 200. As shown, GUI 200 includes display area 700 that is configured to provide alerts to a user of the client device 105 on which GUI 200 is being presented. For this example, the defined number of alerts that alert manager 125 determines is five alerts. As such, display area 700 includes five alerts 705, 710, 715, 720, 725. Each of the alerts 705, 710, 715, 720, 725 indicates a change to data associated with a visualization.

Returning to FIG. 1, action manager 130 is configured to determine suggestions of actions to take in response to an alert. For instance, action manager 130 may receive a notification from alert manager 125 of alerts that it has generated. In response, action manager 130 can determine suggestions of actions to take in response to those alerts. In some cases, a user has provided an operational model that includes a set of parameters. For example, the operational model may be for a business that sells baked goods. Examples of parameters for the operational model can include production quantities for products, ingredients for products, vendors from which to source ingredients, etc. Based on the values of the parameters in the operational model, one or more KPIs can be calculated. For instance, a working time KPI, an available working time KPI, a revenue KPI, a cost KPI, a net profit KPI, and a margin KPI may be calculated from the example operational model. Action manager 130 can use a predictive machine learning model for each KPI that estimates how much each factor in the dataset drives a given KPI. In some embodiments, action manager 130 uses a linear regression model to determine adjustments to parameters in the operational model that can be made to make corresponding changes to a particular KPI in the operational model. Action manager 130 determines these adjustments to be suggestions of actions to take in response to an alert indicating a change to a visualization.

Figure 8:
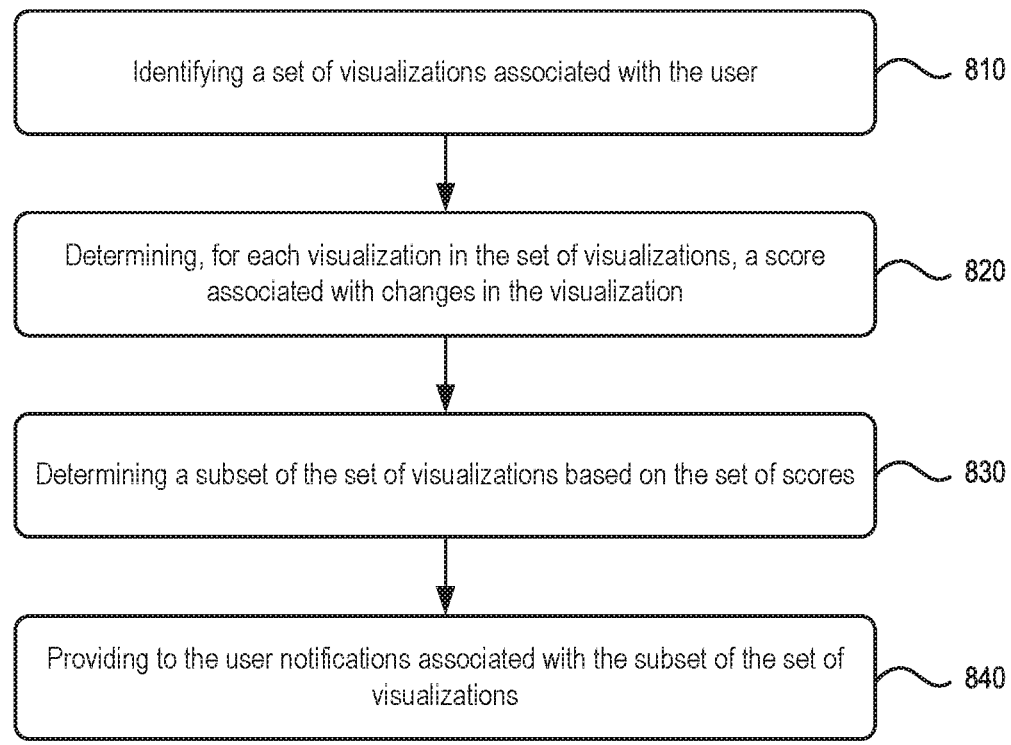
FIG. 8 illustrates a process for determining alerts according to some embodiments.

FIG. 8 illustrates a process 800 for determining alerts according to some embodiments. In some embodiments, computing system 110 performs process 800. Process 800 begins by identifying, at 810, a set of visualizations associated with the user. Referring to FIGS. 1 and 2 as an example, alert manager 125 may determine that visualizations provided in GUI 200 that is presented to a user of client device 105 are the set of visualizations associated with the user.

At 820, process 800 determines, for each visualization in the set of visualizations, a score associated with changes in the visualization, Referring to FIG. 1 as an example, alert manager 125 can determine a score for each visualization in the set of visualizations. In some embodiments, alert manager 125 determines a score for a visualization based on the six criteria described above. Next, process 800 determines, at 830, a subset of the set of visualizations based on the set of scores. Referring to FIG. 1 as an example, alert manager 125 may determine a defined number of alerts to provide to a user of a client device 105 at a given time. Alert manager 125 determines the alerts to generate based on visualizations with the highest scores.

Finally, process 800 provides, at 840, to the user notifications associated with the subset of the set of visualizations. Referring to FIGS. 1 and 7 as an example, alert manager 125 determined five alerts for visualizations with the highest scores for the user. Application 115 provided the alerts via GUI 200 as shown in FIG. 7.

Figure 9:
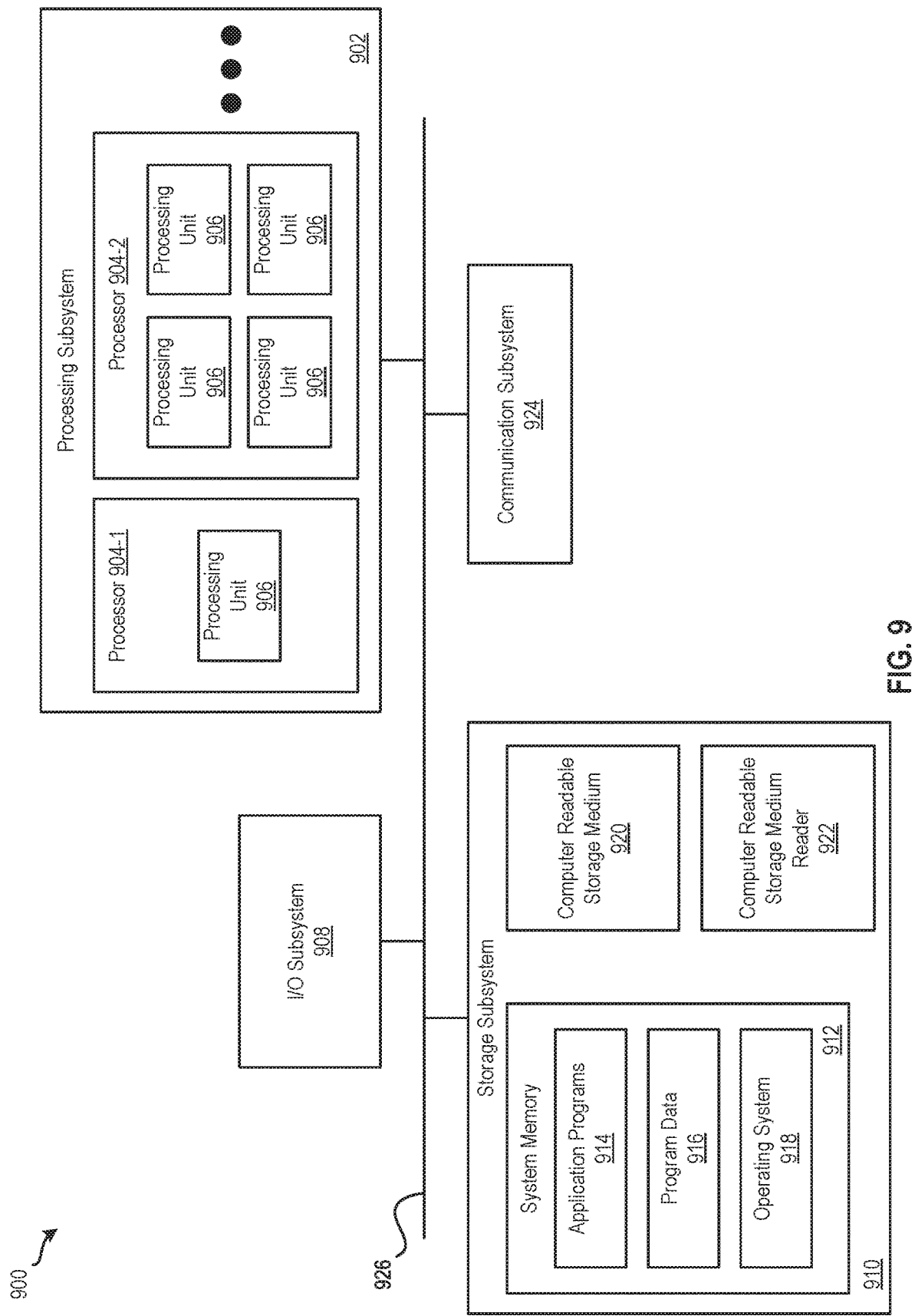
FIG. 9 illustrates an exemplary computer system, in which various embodiments may be implemented.

FIG. 9 illustrates an exemplary computer system 900 for implementing various embodiments described above. For example, computer system 900 may be used to implement client devices 105a-n and computing system 110. Computer system 900 may be a desktop computer, a laptop, a server computer, or any other type of computer system or combination thereof. Some or all elements of application 115, suggestion engine 120, alert manager 125, action manager 130, or combinations thereof can be included or implemented in computer system 900. In addition, computer system 900 can implement many of the operations, methods, and/or processes described above (e.g., process 800). As shown in FIG. 9, computer system 900 includes processing subsystem 902, which communicates, via bus subsystem 926, with input/output (I/O) subsystem 908, storage subsystem 910 and communication subsystem 924.

Bus subsystem 926 is configured to facilitate communication among the various components and subsystems of computer system 900. While bus subsystem 926 is illustrated in FIG. 9 as a single bus, one of ordinary skill in the art will understand that bus subsystem 926 may be implemented as multiple buses. Bus subsystem 926 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 902, which can be implemented as one or more integrated circuits (e.g., a conventional microprocessor or microcontroller), controls the operation of computer system 900. Processing subsystem 902 may include one or more processors 904. Each processor 904 may include one processing unit 906 (e.g., a single core processor such as processor 904-1) or several processing units 906 (e.g., a multicore processor such as processor 904-2). In some embodiments, processors 904 of processing subsystem 902 may be implemented as independent processors while, in other embodiments, processors 904 of processing subsystem 902 may be implemented as multiple processors integrated into a single chip or multiple chips. Still, in some embodiments, processors 904 of processing subsystem 902 may be implemented as a combination of independent processors and multiple processors integrated into a single chip or multiple chips.

In some embodiments, processing subsystem 902 can execute a variety of programs or processes in response to program code and can maintain multiple concurrently executing programs or processes. At any given time, some or all of the program code to be executed can reside in processing subsystem 902 and/or in storage subsystem 910. Through suitable programming, processing subsystem 902 can provide various functionalities, such as the functionalities described above by reference to process 800, etc.

I/O subsystem 908 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 900 to a user or another device (e.g., a printer).

As illustrated in FIG. 9, storage subsystem 910 includes system memory 912, computer-readable storage medium 920, and computer-readable storage medium reader 922. System memory 912 may be configured to store software in the form of program instructions that are loadable and executable by processing subsystem 902 as well as data generated during the execution of program instructions. In some embodiments, system memory 912 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 912 may include different types of memory, such as static random access memory (SRAM) and/or dynamic random access memory (DRAM). System memory 912 may include a basic input/output system (BIOS), in some embodiments, that is configured to store basic routines to facilitate transferring information between elements within computer system 900 (e.g., during start-up). Such a BIOS may be stored in ROM (e.g., a ROM chip), flash memory, or any other type of memory that may be configured to store the BIOS.

As shown in FIG. 9, system memory 912 includes application programs 914 (e.g., client application 110a-n), program data 916, and operating system (OS) 918. OS 918 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 920 may be a non-transitory computer-readable medium configured to store software (e.g., programs, code modules, data constructs, instructions, etc.). Many of the components (e.g., application 115, suggestion engine 120, alert manager 125, and action manager 130) and/or processes (e.g., process 800) described above may be implemented as software that when executed by a processor or processing unit (e.g., a processor or processing unit of processing subsystem 902) performs the operations of such components and/or processes. Storage subsystem 910 may also store data used for, or generated during, the execution of the software.

Storage subsystem 910 may also include computer-readable storage medium reader 922 that is configured to communicate with computer-readable storage medium 920. Together and, optionally, in combination with system memory 912, computer-readable storage medium 920 may comprehensively represent remote, local, fixed, and/or removable storage devices plus storage media for temporarily and/or more permanently containing, storing, transmitting, and retrieving computer-readable information.

Computer-readable storage medium 920 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 924 serves as an interface for receiving data from, and transmitting data to, other devices, computer systems, and networks. For example, communication subsystem 924 may allow computer system 900 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 924 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 924 may provide components configured for wired communication (e.g., Ethernet) in addition to or instead of components configured for wireless communication.

One of ordinary skill in the art will realize that the architecture shown in FIG. 9 is only an example architecture of computer system 900, and that computer system 900 may have additional or fewer components than shown, or a different configuration of components. The various components shown in FIG. 9 may be implemented in hardware, software, firmware or any combination thereof, including one or more signal processing and/or application specific integrated circuits.

Figure 10:
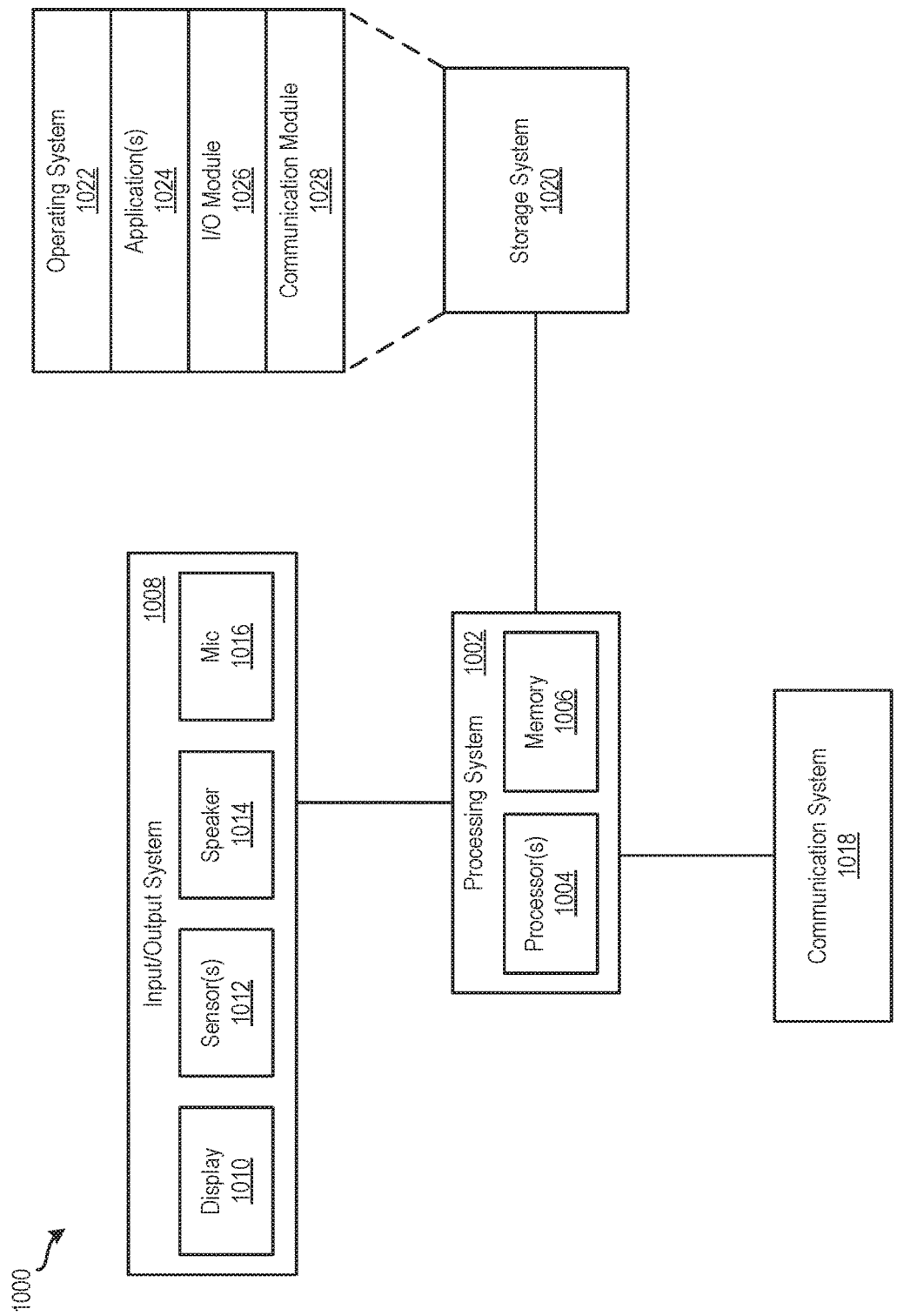
FIG. 10 illustrates an exemplary computing device, in which various embodiments may be implemented.

FIG. 10 illustrates an exemplary computing device 1000 for implementing various embodiments described above. For example, computing device 1000 may be used to implement client devices 105 a-n. Computing device 1000 may be a cellphone, a smartphone, a wearable device, an activity tracker or manager, a tablet, a personal digital assistant (PDA), a media player, or any other type of mobile computing device or combination thereof. As shown in FIG. 10, computing device 1000 includes processing system 1002, input/output (I/O) system 1008, communication system 1018, and storage system 1020. These components may be coupled by one or more communication buses or signal lines.

Processing system 1002, which can be implemented as one or more integrated circuits (e.g., a conventional microprocessor or microcontroller), controls the operation of computing device 1000. As shown, processing system 1002 includes one or more processors 1004 and memory 1006. Processors 1004 are configured to run or execute various software and/or sets of instructions stored in memory 1006 to perform various functions for computing device 1000 and to process data.

Each processor of processors 1004 may include one processing unit (e.g., a single core processor) or several processing units (e.g., a multicore processor). In some embodiments, processors 1004 of processing system 1002 may be implemented as independent processors while, in other embodiments, processors 1004 of processing system 1002 may be implemented as multiple processors integrated into a single chip. Still, in some embodiments, processors 1004 of processing system 1002 may be implemented as a combination of independent processors and multiple processors integrated into a single chip.

Memory 1006 may be configured to receive and store software (e.g., operating system 1022, applications 1024, I/O module 1026, communication module 1028, etc. from storage system 1020) in the form of program instructions that are loadable and executable by processors 1004 as well as data generated during the execution of program instructions. In some embodiments, memory 1006 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1008 is responsible for receiving input through various components and providing output through various components. As shown for this example, I/O system 1008 includes display 1010, one or more sensors 1012, speaker 1014, and microphone 1016. Display 1010 is configured to output visual information (e.g., a graphical user interface (GUI) generated and/or rendered by processors 1004). In some embodiments, display 1010 is a touch screen that is configured to also receive touch-based input. Display 1010 may be implemented using liquid crystal display (LCD) technology, light-emitting diode (LED) technology, organic LED (OLED) technology, organic electro luminescence (OEL) technology, or any other type of display technologies. Sensors 1012 may include any number of different types of sensors for measuring a physical quantity (e.g., temperature, force, pressure, acceleration, orientation, light, radiation, etc.). Speaker 1014 is configured to output audio information and microphone 1016 is configured to receive audio input. One of ordinary skill in the art will appreciate that I/O system 1008 may include any number of additional, fewer, and/or different components. For instance, I/O system 1008 may include a keypad or keyboard for receiving input, a port for transmitting data, receiving data and/or power, and/or communicating with another device or component, an image capture component for capturing photos and/or videos, etc.

Communication system 1018 serves as an interface for receiving data from, and transmitting data to, other devices, computer systems, and networks. For example, communication system 1018 may allow computing device 1000 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1018 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1018 may provide components configured for wired communication (e.g., Ethernet) in addition to or instead of components configured for wireless communication.

Storage system 1020 handles the storage and management of data for computing device 1000. Storage system 1020 may be implemented by one or more non-transitory machine-readable mediums that are configured to store software (e.g., programs, code modules, data constructs, instructions, etc.) and store data used for, or generated during, the execution of the software. Many of the components (e.g., client applications 110*a-n*) described above may be implemented as software that when executed by a processor or processing unit (e.g., processors 1004 of processing system 1002) performs the operations of such components and/or processes.

In this example, storage system 1020 includes operating system 1022, one or more applications 1024, I/O module 1026, and communication module 1028. Operating system 1022 includes various procedures, sets of instructions, software components and/or drivers for controlling and managing general system tasks (e.g., memory management, storage device control, power management, etc.) and facilitates communication between various hardware and software components. Operating system 1022 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1024 can include any number of different applications installed on computing device 1000. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1026 manages information received via input components (e.g., display 1010, sensors 1012, and microphone 1016) and information to be outputted via output components (e.g., display 1010 and speaker 1014). Communication module 1028 facilitates communication with other devices via communication system 1018 and includes various software components for handling data received from communication system 1018.

One of ordinary skill in the art will realize that the architecture shown in FIG. 10 is only an example architecture of computing device 1000, and that computing device 1000 may have additional or fewer components than shown, or a different configuration of components. The various components shown in FIG. 10 may be implemented in hardware, software, firmware or any combination thereof, including one or more signal processing and/or application specific integrated circuits.

Figure 11:
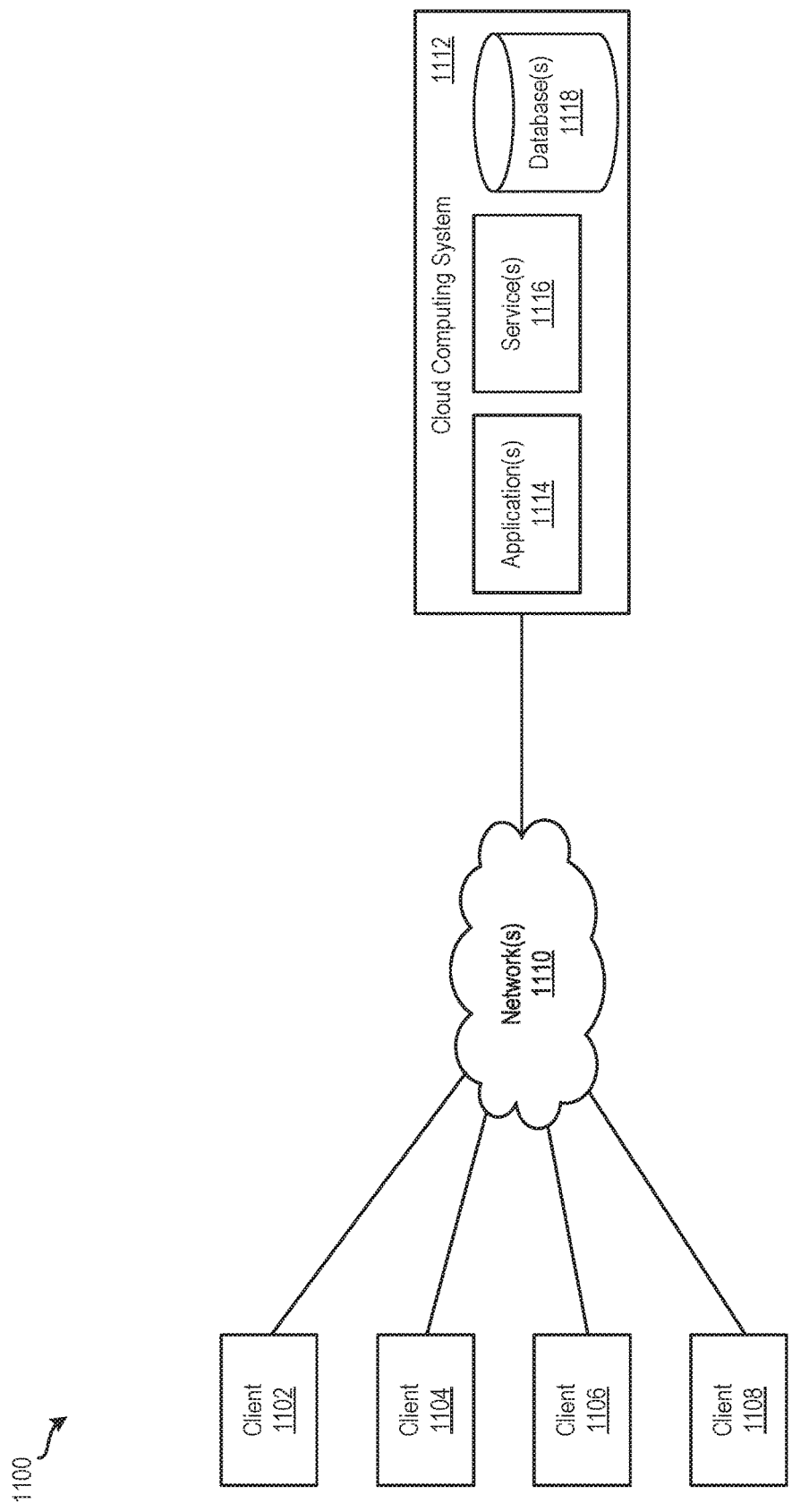
FIG. 11 illustrates an exemplary system, in which various embodiments may be implemented.

FIG. 11 illustrates an exemplary system 1100 for implementing various embodiments described above. For example, cloud computing system 1112 may be used to implement computing system 110 and client devices 1102, 1104, 1106, 1108 may be used to implement client devices 105 *a-n*. As shown, system 1100 includes client devices 1102, 1104, 1106, 1108, one or more networks 1110, and cloud computing system 1112. Cloud computing system 1112 is configured to provide resources and data to client devices 1102, 1104, 1106, 1108, via networks 1110. In some embodiments, cloud computing system 1112 provides resources to any number of different users (e.g., customers, tenants, organizations, etc.). Cloud computing system 1112 may be implemented by one or more computer systems (e.g., servers), virtual machines operating on a computer system, or a combination thereof.

As shown, cloud computing system 1112 includes one or more applications 1114, one or more services 1116, and one or more databases 1118. Cloud computing system 1112 may provide applications 1114, services 1116, and databases 1118 to any number of different customers in a self-service, subscription-based, elastically scalable, reliable, highly available, and secure manner.

In some embodiments, cloud computing system 1112 may be adapted to automatically provision, manage, and track a customer's subscriptions to services offered by cloud computing system 1112. Cloud computing system 1112 may provide cloud services via different deployment models. For example, cloud services may be provided under a public cloud model in which cloud computing system 1112 is owned by an organization selling cloud services and the cloud services are made available to the general public or different industry enterprises. As another example, cloud services may be provided under a private cloud model in which cloud computing system 1112 is operated solely for a single organization and may provide cloud services for one or more entities within the organization. The cloud services may also be provided under a community cloud model in which cloud computing system 1112 and the cloud services provided by cloud computing system 1112 are shared by several organizations in a related community. The cloud services may also be provided under a hybrid cloud model, which is a combination of two or more of the aforementioned different models.

In some instances, any one of applications 1114, services 1116, and databases 1118 made available to client devices 1102, 1104, 1106, 1108, via networks 1110 from cloud computing system 1112 is referred to as a "cloud service." Typically, servers and systems that make up cloud computing system 1112 are different from the on-premises servers and systems of a customer. For example, cloud computing system 1112 may host an application and a user of one of client devices 1102-1108 may order and use the application via networks 1110.

Applications 1114 may include software applications that are configured to execute on cloud computing system 1112 (e.g., a computer system or a virtual machine operating on a computer system) and be accessed, controlled, managed, etc. via client devices 1102, 1104, 1106, 1108. In some embodiments, applications 1114 may include server applications and/or mid-tier applications (e.g., HTTP (hypertext transport protocol) server applications, FTP (file transfer protocol) server applications, CGI (common gateway interface) server applications, JAVA server applications, etc.). Services 1116 are software components, modules, application, etc. that are configured to execute on cloud computing system 1112 and provide functionalities to client devices 1102, 1104, 1106, 1108 via networks 1110. Services 1116 may be web-based services or on-demand cloud services.

Databases 1118 are configured to store and/or manage data that is accessed by applications 1114, services 1116, and/or client devices 1102, 1104, 1106, 1108. For instance, storages 135-150 may be stored in databases 1118. Databases 1118 may reside on a non-transitory storage medium local to (and/or resident in) cloud computing system 1112, in a storage-area network (SAN), on a non-transitory storage medium local located remotely from cloud computing system 1112. In some embodiments, databases 1118 may include relational databases that are managed by a relational database management system (RDBMS). Databases 1118 may be a column-oriented databases, row-oriented databases, or a combination thereof. In some embodiments, some or all of databases 1118 are in-memory databases. That is, in some such embodiments, data for databases 1118 are stored and managed in memory (e.g., random access memory (RAM)).

Client devices 1102, 1104, 1106, 1108 are configured to execute and operate a client application (e.g., a web browser, a proprietary client application, etc.) that communicates with applications 1114, services 1116, and/or databases 1118 via networks 1110. This way, client devices 1102-1108 may access the various functionalities provided by applications 1114, services 1116, and databases 1118 while applications 1114, services 1116, and databases 1118 are operating (e.g., hosted) on cloud computing system 1112. Client devices 1102, 1104, 1106, 1108 may be computer system 1100 or computing device 1000, as described above by reference to FIGS. 9 and 10, respectively. Although system 1100 is shown with four client devices, any number of client devices may be supported.

Networks 1110 may be any type of network configured to facilitate data communications among client devices 1102, 1104, 1106, 1108 and cloud computing system 1112 using any of a variety of network protocols. Networks 1110 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for customizing a subset of visualizations for a particular user using a machine-learning based predictive model trained on user feedback:
    displaying a set of visualizations to a user on a user interface of a client device, the set of visualizations associated with the user of the client device;
    calculating a score for each visualization in the set of visualizations, wherein the score is based on a plurality of criteria,
    said plurality of criteria comprising: a count of a same key performance indicator (KPI) in other visualizations and other visualizations to which the user is subscribed;
    wherein calculating the score comprises calculating a weighted sum of the scores for each criteria, wherein a weight for each criteria is based on the machine-learning based predictive model trained on user feedback;
    determining the subset of the set of visualizations corresponding to a plurality of highest scores; and
    displaying notifications to the user on the user interface of the client device for the subset, the notifications indicating the data associated with the subset of the set of visualizations has changed.

2. The non-transitory machine-readable medium of claim 1, wherein the program further comprises sets of instructions for:
    determining the particular visualization based on a history of interactions with visualizations performed by the user, wherein the user is not subscribed to the particular visualization; and
    providing the client device with a notification indicating the particular visualization as a suggestion for subscribing.

3. The non-transitory machine-readable medium of claim 2, wherein determining the history of interactions comprises:
    determining a number of views of the particular visualization by the user that is greater than a defined threshold number of views.

4. The non-transitory machine-readable medium of claim 2, wherein the particular visualization is a first visualization, and wherein determining the first visualization comprises:
    determining the history of interactions comprises:
        determining interactions with a second visualization; and
        determining at least one entity of data used by the first visualization is the same as an entity of data used by the second visualization.

5. The non-transitory machine-readable medium of claim 2, wherein the particular visualization is a first visualization, and wherein determining the first visualization comprises:
    determining the history of interactions comprises:
        determining interactions with a second visualization; and
        determining that a title of the first visualization is similar to a title of the second visualization.

6. The non-transitory machine-readable medium of claim 2, wherein determining the particular visualization comprises:
    determining a set of users who are similar to the user; and
    determining the particular visualization is subscribed to by at least one user in the set of users.

7. The non-transitory machine-readable medium of claim 1, wherein displaying the set of visualizations further comprises:
    providing suggestions to the user of visualizations to subscribe to based on a model-based technique, a memory-based technique, or a text-embedding based technique.

8. A method for customizing a subset of visualizations for a particular user using a machine-learning based predictive model trained on user feedback comprising:
    displaying a set of visualizations to a user on a user interface of a client device, the set of visualizations associated with the user of the client device;
    calculating a score for each visualization in the set of visualizations, wherein the score is based on a plurality of criteria,
    said plurality of criteria comprising: a count of a same key performance indicator (KPI) in other visualizations and other visualizations to which the user is subscribed,
    wherein calculating the score comprises calculating a weighted sum of the scores for each criteria, wherein a weight for each criteria is based on the machine-learning based predictive model trained on user feedback;
    determining the subset of the set of visualizations corresponding to a plurality of highest scores; and
    displaying notifications to the user on the user interface of the client device for the subset, the notifications indicating the data associated with the subset of the set of visualizations has changed.

9. The method of claim 8 further comprising:
    determining the particular visualization based on a history of interactions with visualizations performed by the user, wherein the user is not subscribed to the particular visualization; and
    providing a notification to a client device indicating the particular visualization as a suggestion for subscribing.

10. The method of claim 9, wherein determining the history of interactions comprising:
    determining a number of views of the particular visualization by the user that is greater than a defined threshold number of views.

11. The method of claim 9, wherein the particular visualization is a first visualization, and wherein determining the first visualization comprises:
    determining the history of interactions comprising:
        determining interactions with a second visualization; and
        determining at least one entity of data used by the first visualization is the same as an entity of data used by the second visualization.

12. The method of claim 9, wherein the particular visualization is a first visualization, and wherein determining the first visualization comprises:
    determining the history of interactions comprising:
        determining interactions with a second visualization; and
        determining that a title of the first visualization is similar to a title of the second visualization.

13. The method of claim 9, wherein determining the particular visualization comprises:
    determining a set of users who are similar to the user; and
    determining the particular visualization is subscribed to by at least one user in the set of users.

14. The method of claim 8, wherein displaying the set of visualizations further comprises:
    providing suggestions to the user of visualizations to subscribe to based on a model-based technique, a memory-based technique, or a text-embedding based technique.

15. A system for customizing a subset of visualizations for a particular user using a machine-learning based predictive model trained on user feedback comprising:
    a set of processing units; and
    a non-transitory machine-readable medium storing instructions that when executed by at least one processing unit in the set of processing units cause the at least one processing unit to:
        display a set of visualizations to a user on a user interface of a client device, the set of visualizations associated with the user of the client device;
        calculate a score for each visualization in the set of visualizations, wherein the score is based on a plurality of criteria,
        said plurality of criteria comprising: a count of a same key performance indicator (KPI) in other visualizations and other visualizations to which the user is subscribed;
        wherein calculating the score comprises calculating a weighted sum of the scores for each criteria, wherein a weight for each criteria is based on the machine-learning based predictive model trained on user feedback;
        determine the subset of the set of visualizations corresponding to a plurality of highest scores; and
        display notifications to the user on the user interface of the client device for the subset, the notifications indicating the data associated with the subset of the set of visualizations has changed.

16. The system of claim 15, wherein the instructions further cause the at least one processing unit to:

determine the particular visualization based on a history of interactions with visualizations performed by the user, wherein the user is not subscribed to the particular visualization; and provide to a client device a notification indicating the particular visualization as a suggestion for subscribing.

17. The system of claim 16, wherein determining the history of interactions comprises:
    determining a number of views of the particular visualization by the user that is greater than a defined threshold number of views.

18. The system of claim 16, wherein the particular visualization is a first visualization, and wherein determining the first visualization comprises:
    determining the history of interactions comprising:
        determining interactions with a second visualization; and
        determining at least one entity of data used by the first visualization is the same as an entity of data used by the second visualization.

19. The system of claim 16, wherein the particular visualization is a first visualization, and wherein determining the first visualization comprises:
    determining the history of interactions comprising:
        determining interactions with a second visualization; and
        determining that a title of the first visualization is similar to a title of the second visualization.

20. The system of claim 15, wherein displaying the set of visualizations further comprises:
    providing suggestions to the user of visualizations to subscribe to based on a model-based technique, a memory-based technique, or a text-embedding based technique.

* * * * *